US00RE46140E

(19) United States
(12) Reissued Patent
Wang et al.

(10) Patent Number: US RE46,140 E
(45) Date of Reissued Patent: *Sep. 6, 2016

(54) METHOD AND SYSTEM FOR CONDUCTING BUSINESS IN A TRANSNATIONAL E-COMMERCE NETWORK

(75) Inventors: Tiejun Wang, Arlington, VA (US); Ximing Wang, Beijing (CN); Tiehong Wang, Arlington, VA (US)

(73) Assignee: Virginia Innovation Sciences, Inc., Alexandria, VA (US)

( * ) Notice: This patent is subject to a terminal disclaimer.

(21) Appl. No.: 13/230,657

(22) Filed: Sep. 12, 2011

Related U.S. Patent Documents

Reissue of:
(64) Patent No.: 6,618,705
Issued: Sep. 9, 2003
Appl. No.: 09/552,681
Filed: Apr. 19, 2000

U.S. Applications:
(60) Continuation of application No. 12/453,484, filed on May 12, 2009, which is a division of application No. 11/214,311, filed on Aug. 30, 2005, now Pat. No. Re. 40,753, which is an application for the reissue of Pat. No. 6,618,705.

(51) Int. Cl.
*G06Q 30/00* (2012.01)
*G06Q 30/04* (2012.01)
(Continued)

(52) U.S. Cl.
CPC ..... *G06Q 30/04* (2013.01); *G06Q 20/02* (2013.01); *G06Q 20/04* (2013.01); *G06Q 20/12* (2013.01);
(Continued)

(58) Field of Classification Search
CPC ..... G06F 17/60
USPC ..... 705/26, 26.1, 26.81
See application file for complete search history.

(56) References Cited

U.S. PATENT DOCUMENTS 5,671,279 A * 9/1997 Elgamal ..... 380/23
5,729,594 A * 3/1998 Klingman ..... 705/26
(Continued)

FOREIGN PATENT DOCUMENTS

WO WO 0152127 * 7/2001

OTHER PUBLICATIONS

Lei Tang, "A Set of Protocols for Micropayments in Distributed System" Graduate School of Industrial Adminstration (1995).*
(Continued)

*Primary Examiner* — Cameron Saadat
(74) *Attorney, Agent, or Firm* — Michael Best & Friedrich LLP

(57) ABSTRACT

The invention presents a method and system for processing the purchase of products, goods and/or services, more particularly, to a method and system for processing the purchase by a buyer of products from one or more sellers of products in an on-line real-time e-Commerce business environment where the merchant server from which the goods are purchased lacks adequate encryption security for the purchasing of the goods by credit card. The method and system also allows for the easy up-dating registration by a merchant of the items available for purchase as maintained on the Web, DB server. The invention also discloses a method and system for avoiding the hindrance of foreign exchange rates fluctuations on the payment of on-line real-time e-Commerce trading. The system provides for a splitting of a merchant server into a Web, DB server and a payment server, the payment server being located in a nation state to which a purchaser may securely transmit encrypted credit card information in order to purchase product available on websites maintained on the Web, DB server.

4 Claims, 5 Drawing Sheets

(51) Int. Cl.

| | |
|---|---|
| ***G06Q 20/04*** | (2012.01) |
| ***G06Q 20/12*** | (2012.01) |
| ***G06Q 30/06*** | (2012.01) |
| ***G06Q 20/38*** | (2012.01) |
| ***G06Q 20/02*** | (2012.01) |

(52) U.S. Cl.

CPC ..... *G06Q 20/381* (2013.01); *G06Q 20/3823* (2013.01); *G06Q 30/0619* (2013.01); *G06Q 30/0633* (2013.01)

(56) References Cited

U.S. PATENT DOCUMENTS 5,790,677 A * 8/1998 Fox et al. ..... 705/78
5,812,668 A * 9/1998 Weber ..... 705/79
5,822,737 A * 10/1998 Ogram ..... 705/14.4
5,826,241 A * 10/1998 Stein ..... G06Q 10/00 705/26.41
5,903,878 A * 5/1999 Talati et al. ..... 705/26
5,950,172 A * 9/1999 Klingman ..... 705/26
5,991,750 A * 11/1999 Watson ..... 705/44
6,105,008 A * 8/2000 Davis et al. ..... 705/41
6,141,653 A * 10/2000 Conklin et al. ..... 705/80
6,282,522 B1 * 8/2001 Davis et al. ..... 705/41
6,327,578 B1 * 12/2001 Linehan ..... 705/26
6,330,575 B1 * 12/2001 Moore et al. ..... 715/234
6,332,134 B1 * 12/2001 Foster ..... 705/39
6,341,353 B1 * 1/2002 Herman et al. ..... 726/5
6,422,462 B1 * 7/2002 Cohen ..... 235/381
6,477,578 B1 * 11/2002 Mhoon ..... G06Q 20/02 705/38
6,606,744 B1 * 8/2003 Mikurak ..... 717/174
6,671,716 B1 * 12/2003 Diedrichsen et al. ..... 709/203
6,671,818 B1 * 12/2003 Mikurak ..... 714/4.21
6,934,838 B1 * 8/2005 Boyce et al. ..... 713/156
6,970,852 B1 * 11/2005 Sendo et al. ..... 705/67
6,980,962 B1 * 12/2005 Arganbright et al. ..... 705/14.31
7,003,480 B2 * 2/2006 Fox et al. ..... 705/76
7,089,208 B1 * 8/2006 Levchin ..... G06Q 20/02 705/35
7,100,195 B1 * 8/2006 Underwood ..... 726/2
7,366,695 B1 * 4/2008 Allen-Rouman ..... G06Q 20/02 705/39
7,636,696 B1 * 12/2009 Sigler et al. ..... 705/74
7,739,191 B2 * 6/2010 Sutton et al. ..... 705/39
RE41,619 E * 8/2010 Boesch ..... G06Q 20/02 705/26.1
2001/0039535 A1 * 11/2001 Tsiounis et al. ..... 705/71
2001/0051902 A1 * 12/2001 Messner ..... 705/26
2003/0097331 A1 * 5/2003 Cohen ..... 705/39
2003/0208411 A1 * 11/2003 Estes et al. ..... 705/26
2005/0027610 A1 * 2/2005 Wharton ..... 705/26
2005/0131815 A1 * 6/2005 Fung et al. ..... 705/39
2006/0122862 A1 * 6/2006 Ellery Ogram ..... 705/1
2008/0222046 A1 * 9/2008 McIsaac et al. ..... 705/64
2010/0138320 A1 * 6/2010 Gavarini ..... 705/27
2011/0099108 A1 * 4/2011 Fung et al. ..... 705/44
2011/0106702 A1 * 5/2011 Fung et al. ..... 705/44

OTHER PUBLICATIONS

Jackie Cohen, "Merchant Server Market Heats Up" Bank Technology News, v10n2 p. 1+, Feb. 1997, Dialog Flie 9, 01754948.*
Chong Ka Lung, "Internet Payment Methods:Mechanism, Application, and Experimentation" Department of Computer Science and Engineering, Dec. 1999.*

* cited by examiner

METHOD AND SYSTEM FOR CONDUCTING BUSINESS IN A TRANSNATIONAL E-COMMERCE NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 6,618,705. The reissue applications are the present application (application Ser. No. 13/230,657), application Ser. No. 12/453,484, and application Ser. No. 11/214,311. The present application is a Continuation Reissue Application of pending application Ser. No. 12/453,484 filed on May 12, 2009. The application Ser. No. 12/453,484 is a divisional reissue application of application Ser. No. 11/214,311 filed on Aug. 30, 2005, now U.S. Pat. No. Re. 40,753. The application Ser. No. 11/214,311 is a reissue application of Ser. No. 09/552,681 filed on Apr. 19, 2000, now U.S. Pat. No. 6,618,705 originally issued on Sep. 9, 2003. The disclosures of the above-identified pending application Ser. No. 12/453,484, and U.S. Pat. No. Re. 40,753, and U.S. Pat. No. 6,618,705 are all incorporated by reference, herein, in their entirety.*

FIELD OF THE INVENTION

The present invention relates generally to a method and a system of processing the purchase of products, goods and/or services, more particularly, to a method and system for processing the purchase by a buyer of products from one or more sellers of products internationally in an e-Commerce business environment.

BACKGROUND OF THE INVENTION

As the modern world has learned, when the barriers to trade have been reduced or eliminate, whether they be borders or custom, the purchase and sale of products and services has increased globally. Efficiency in production and the allocation of resources to lower cost producers in many former third world countries has led to an expansion and globalization of trade and markets. This has resulted in increased trade for countries such as the People's Republic of China that has become the dominant exporter of products to the United States of America. The introduction and advancement of information technology, particularly so-called "on-line" interactions between computer users has further promoted an expansion from local markets to national market, regional markets and international markets.

In the past several years there has been an explosive growth in the use of globally-linked network of computers known as the Internet, and in particular of the World Wide Web (WWW), which is a facility provided on top of the Internet. The WWW, the universe of Internet-accessible information, comprises many pages or files of information, distributed across many different server computer systems. The availability of this interconnectivity across distances has opened markets previously deemed too remote for effective trading. Further, access to the WWW has empowered real-time access to buyers seeking seller of products and sellers seeking buyers for products which was beyond imagination a mere generation ago. Such empowerment has resulted in the rapid development of commerce on the Internet, with direct marketing and sales occurring on-line.

In the United States of America, a buyer may browse the Internet to determine available products and then purchase those products. In this era of credit card fraud and theft, in the otherwise non-secure transmission environment of the Internet, a buyer can purchase the products on-line through an encrypted credit card transaction, the transfer of credit card information being made under a security protocol, for instance, a Security Socket Layer Protocol (SSL), very commonly a 128 bit protocol, that provides a high degree of security. Such encryption is provided to a browsing potential buyer by means of the merchant server having obtained a digital certificate from a qualified Certificate of Authority (CA). The encryption security provides encryption of credit card information for the buyer at the buyer's terminal before it is transmitted over the Internet to the merchant server that then subjects the information to processing through the established channels maintained by financial institutions for completing the credit transaction between the merchant server's bank (acquiring bank) and the bank represented by the buyer's credit card (buyer bank). Further, confirmation or response of information to the buyer can likewise be forwarded to the buyer from the merchant server by similarly secure encryption techniques. Within most advanced e-Commerce nations where credit cards are used to purchase products over the Internet, the merchant servers function with adequately secure encryption and decryption techniques for the exchange of credit card information.

However, circumstances exist that a buyer in one nation state will not execute a purchase of products from a merchant server located either in the same nation state or in a second nation state because adequately secure encryption and decryption techniques for the exchange of credit card information among the buyer, merchant server, acquiring bank and buyer's bank cannot be achieved. The buyer will very likely not purchase products from a merchant server, without available adequate or compatible encryption and decryption techniques to aid in the transmission of credit card information. (It is noted that a policy of a nation state, for instance, the United States of America with respect to restrictions in the export of encryption technology systems, or, for instance, another nation state with respect to barriers to the importation and/or the lack of adequate encryption technology systems or compatible encryption technology systems arising from high infrastructure capital investment concerns or regulations, pose an obstacle to safe e-Commerce credit card information online transactions.) In addition to the hindrance posed by the credit card security issue for the realization of transnational e-Commerce, the existence of foreign exchange rate fluctuations presents a major obstacle to achieving the smooth functioning of e-Commerce across borders.

SUMMARY OF THE INVENTION

A method and system are disclosed which permits a buyer requiring adequately secure encryption and decryption techniques for purchasing products from a merchant server that does not provide such techniques.

An object of the invention is to provide a method and system which overcomes the lack of adequately secure encryption and decryption in a merchant server to which a buyer wishes to provide credit card information for the purchase of products posted on such merchant server.

Another object of the invention is to promote the availability of product to buyers through expanding the method and system by which the buyers' credit card information can be subjected to adequately secure encryption and decryption in the Internet environment.

A further object of the invention is to promote an on-line purchase from a merchant that would not otherwise achieve sales due to incompatible credit card information encryption systems between the acquiring bank and the buyer's bank.

An additional object of the invention is enhanced inventory control and production for merchants and merchant manufacturers through the provision of a real-time purchasing/sales environment via the mechanism of a readily refreshed cache on a web server.

A further additional object of the invention is to provide a method of transacting real-time sales internationally that promotes certainty of business costs through the limiting of the impact of currency fluctuations.

Additionally, an object of the invention is the enabling of a bidding system for products in a merchant server, the purchaser submitting needs requirements in solicitation of bids from merchants providing products.

Another object of the invention, by locating the Web, DB server close to the buyers with a high-speed local network, is to resolve the problem of bandwidth bottleneck occurring in cross-border internet transmission, particularly high-speed transmission for multimedia files that may not pass current international WWW network connections quickly and smoothly.

A more complete understanding of the present invention, as well as further features and advantages of the present invention, will be obtained by reference to the following drawings and detailed description.

DETAILED DESCRIPTION OF THE INVENTION

Figure 1:
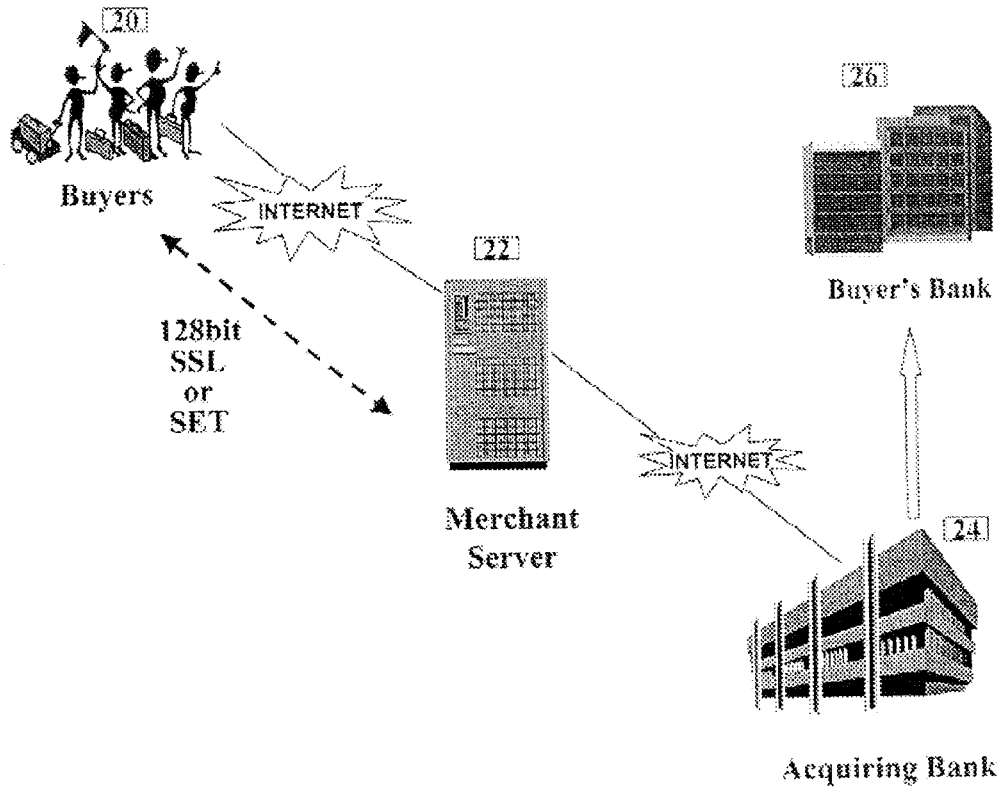
FIG. 1 is a schematic illustrating the conventional Internet transaction system where the merchant server provides adequately secure encryption, for example 128 bit SSL or SET, for the transmission of credit card information over the internet.

FIG. 1 shows a conventional Internet transaction system having adequate credit card information security, in this case 128 bit SSL or SET protocol security under a Certificate of Authority, where one or more buyers 20 may browse the product website(s) of merchant server 22. When a product displayed on a particular merchant website on the merchant server 22 is determined by a buyer to be purchased, the credit card information is entered onto the secure transaction system. The merchant server 22 then transmits the encrypted information to the acquiring bank 24 that decrypts the information, as necessary, and forwards the information through established financial circuits to the buyer's bank 26 that processes the information for debiting against the credit card account of the buyer 20 and for crediting payment to the merchant. The buyer's bank 26 then replies via established financial transmission circuits to the acquiring bank 24. The acquiring bank 24 then replies through the secure transaction encryption system to the buyer 20 with confirmation or rejection based upon the credit card information provided and authenticated by the buyer's bank 26. If the purchase is confirmed, the acquiring bank 24 will provide purchase confirmation information to the buyer 20 through payment server 33. The net result is the real-time purchase of a product using the Internet.

Figure 2:
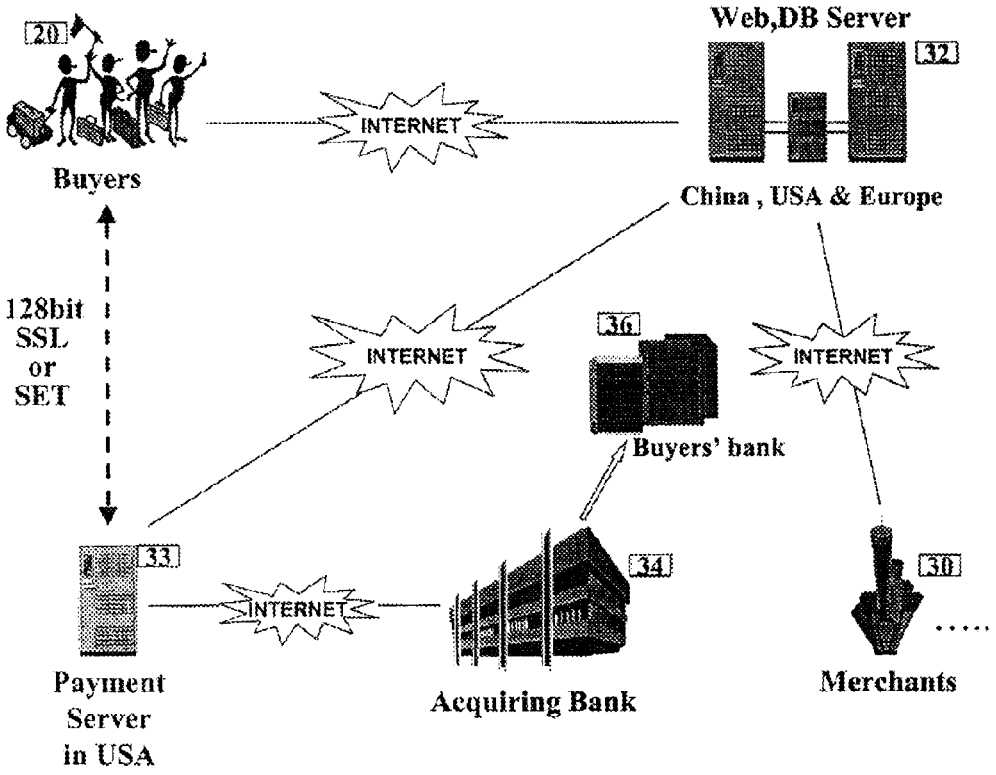
FIG. 2 is a schematic illustrating the inventive system in which the merchant server does not provide adequately secure encryption for the transmission of credit card information over the Internet, wherein the payment server is located in the United States.

FIG. 2 shows the inventive system for the conducting of an Internet transaction wherein at least one merchant 30 maintains a website of products available for sale on the Web, DB (Database) server 32. In this case, server 32, in contradistinction to the merchant server 22 in FIG. 1, does not have a credit card information transaction security system sufficiently adequate to meet the security requirements of a buyer for making a purchase. The elements of the system are the Web, DB server 32, which is located in either the same nation state of the buyer or in another nation state; a payment server 33 separate from the WEB, DB server 32, the payment server 33 having a credit card information security system sufficient to meet a buyer's security requirements for making a purchase, and being located in either the same nation state as the buyer or in another nation state; an acquiring bank 34; and a buyer's bank. When a product displayed on a particular merchant website on the server 32 is determined by the buyer to be purchased and the buyer indicates a desire to submit credit card information, the buyer is shifted to the payment server 33 for direct communication therewith for entry of credit card information onto the secure transaction system. The payment server 33 then transmits the encrypted information to the acquiring bank 34 that decrypts the information, as necessary, and forwards the information through established financial circuitry to the buyer's bank 36 that processes the information for debiting against the credit card account of the buyer 20. The buyer's bank 36 then replies via established financial transmission circuitry to the acquiring bank 34. The acquiring bank 34 then replies through the secure transaction system to the payment server 33 with confirmation or rejection based upon the credit card information provided and authenticated by the buyer's bank 36. If the purchase is confirmed, the payment server 33 will provide purchase information to the buyer 20. Further, if the purchase is confirmed to the buyer 20, the payment server 33 communicates the purchase to the WEB, DB server 32 whereby the merchant 30 whose product is sold is provided with notice of the purchase thereby enabling refreshment of product inventory and updating of its website on the Web, DB server 32. The net result is the real-time purchase of a product using the Internet.

Additionally, in the inventive system, the server 32 is provided with the facility whereby each of merchants may provide products available for purchase into a database on the server which functions similar to a cache in a computer. A merchant may refresh or update the stored data, as needs required, at any time, thereby permitting the server to maintain the latest information regarding available product. Thus, a merchant in response to notification of purchase by the server 32, may take immediate steps to update information in relation to inventory and anticipated production.

Also, in the inventive system, given that the merchants have product information stored on the server, a facility is provided to permit a perspective purchaser to submit a needs requirement to the server 32 and makes the requirement accessible to all merchants having responsive products on the server thereby permitting real-time response to the requirement rather than to delayed submission of bids arising product information being stored outside of the server.

The systems in FIG. 1 and FIG. 2 are illustrated with secure credit card information transmission systems of the 128 bit SSL or SET. The illustration of these systems is not a limitation but is an indication of available bit level and security protocol. Other bit level and protocol systems are usable so long as they provide adequate security for the encryption of credit card information transmitted over the Internet. Further, the payment server 33 may provide the buyer with the option of a variety of secure encryption systems. Further, in FIG. 2, the indicia of China, USA & Europe with respect to the Web, DB server 32, and the indicia of "in USA" with respect to the payment server 33, are illustrative and in no way limiting as to the location of either servers.

Figure 3:
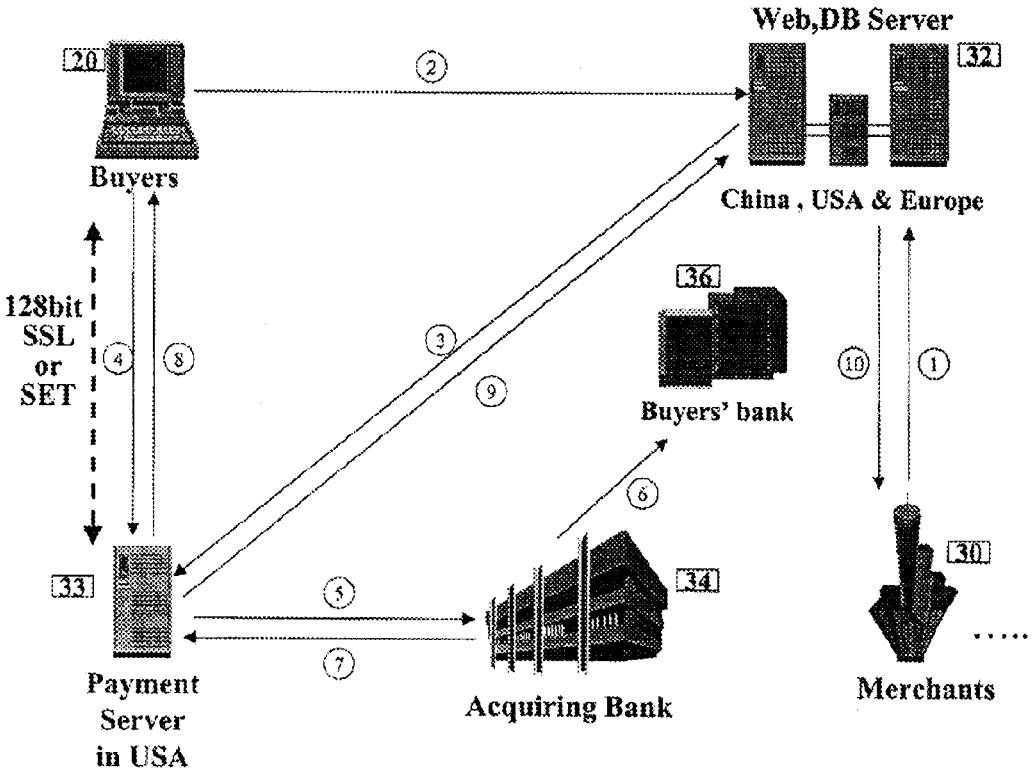
FIG. 3 is a schematic illustrating the inventive method in which the merchant server does not provide adequately secure encryption for the transmission of credit card information over the Internet, wherein the payment server is located in the United States.

FIG. 3 illustrates the inventive method by which the system of FIG. 2 is operated in conducting business in an e-Commerce network. The steps of the process are indicated by encircled numbers 1 through 10, which for ease of description are addressed simply as steps 1 through 10.

Step 1

Merchants 30 provide Web, DB Server 32 with a listing of products available for sale.

Step 2

One of buyers 20 browses websites of Web, DB server 32 for products available for sale, selects product(s) for purchase and indicates payment by credit card.

Step 3

The buyer 20 is switched from Web, DB Server 32 to payment server 33 for secure encryption transmission of credit card payment information.

Step 4

Buyer 20 transmits credit card payment information under a secure encryption protocol.

Step 5

Payment server 33 transmits encrypted credit card payment information to acquiring bank 34.

Step 6

Acquiring bank 34 processes encrypted credit card payment information and transmits information to buyer's bank 36 which confirms or rejects credit card payment and responds to acquiring bank 34, and if confirms, internally debits buyer's account and credit's merchant's account.

Step 7

Acquiring bank 34 transmits encrypted response from buyer's bank 36 to payment server 33.

Step 8

Payment server 33 provides encrypted response transmitted by acquiring bank 34 to buyer 20.

Step 9

If purchase is confirmed to buyer 22, payment server 33 communicates the purchase information to the Web, DB server 32.

Step 10

Web, DB server 32 provides purchase confirmation information to selling merchant 30.

Through the above-described method a merchant maintaining a website of products for sale on a server which itself cannot provide an adequately secure encryption system for the transmission of credit card information to sell to a buyer who would otherwise not purchase products on the Internet.

Figure 4A:
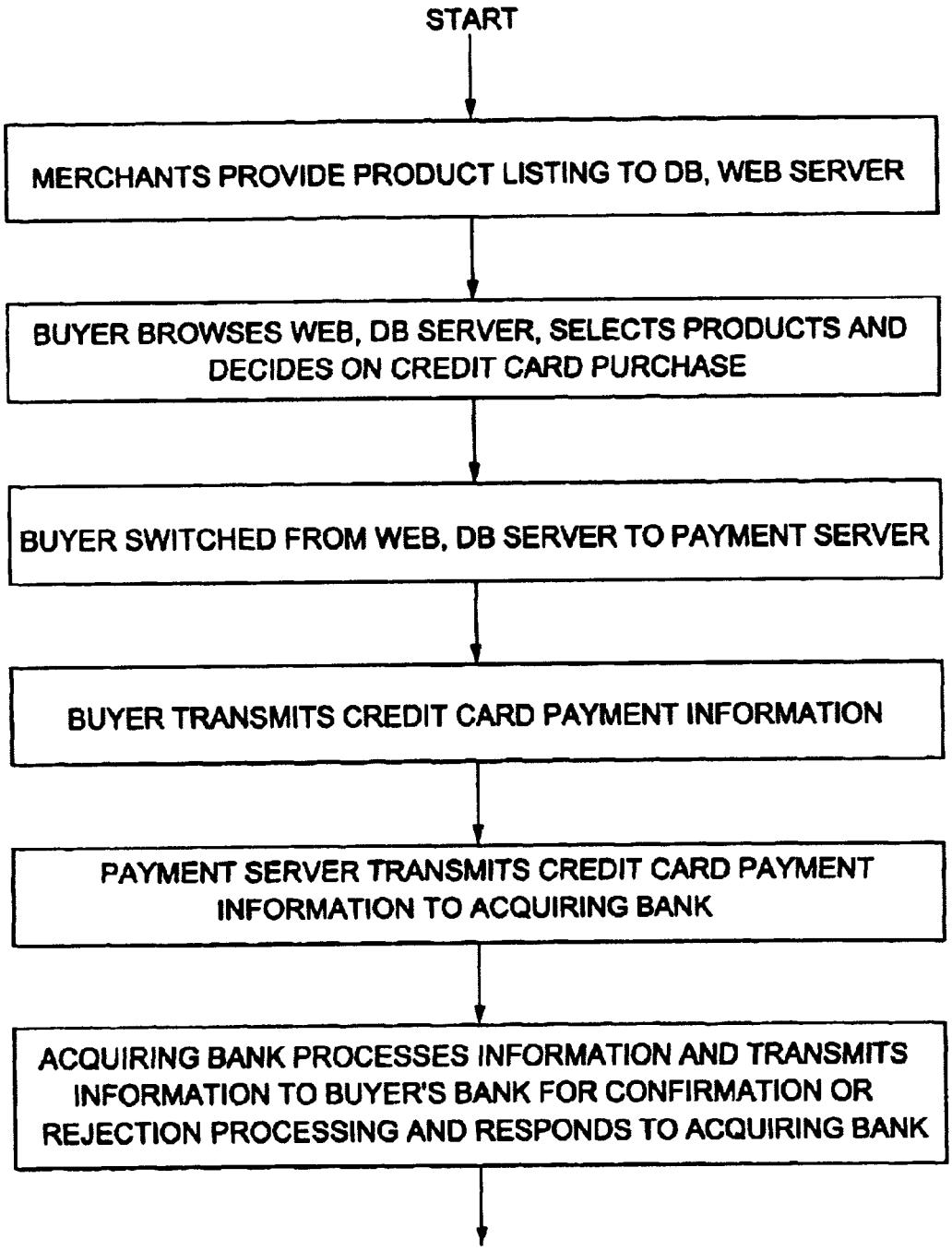
FIG. 4A is a flowchart describing the first portion of the method illustrated in FIG. 3.
Figure 4B:
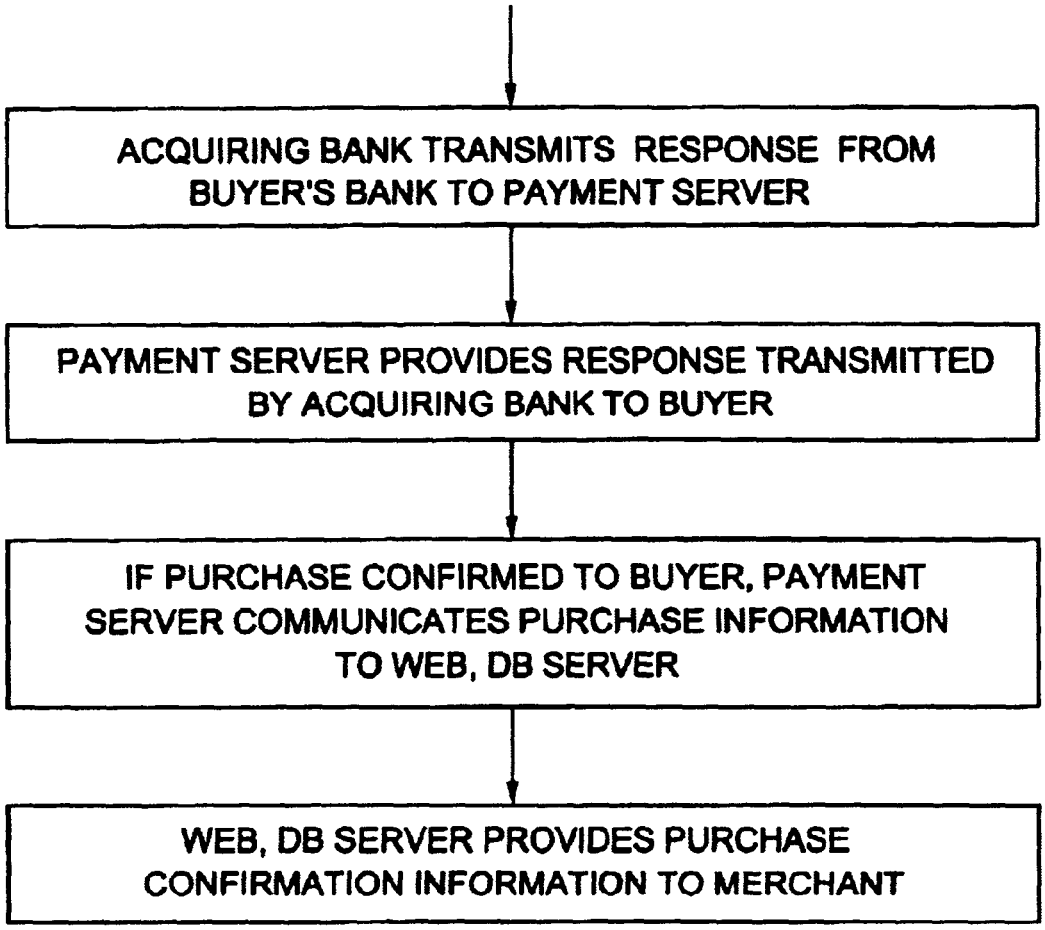
FIG. 4B is a flowchart describing the second portion of the method illustrated in FIG. 3.

FIGS. 4A and 4B provide flow charts of the above-described method, the information provided in the flow charts being incorporated herein by reference.

It is to be understood that the embodiments and variations shown and described herein are merely illustrative of the principles of this invention and that various modifications may be implemented by those skilled in the art without departing from the scope and spirit of the invention.

What I claim is:

[1. A method for conducting on-line purchasing in an e-Commerce transnational business environment, purchasing being conducted over a computer network comprising a payment server having a credit card information transaction security system, a Web, DB server having a credit card information transaction security system less secure than the credit card information transaction security system of the payment server, at least one first remote computer, at least one second remote computer, at least one first communication channel connecting the at least one first remote computer to the payment server and to the Web, DB server, at least one second communication channel connecting the at least one second remote computer to the Web, DB server, and at least one third communication channel connecting the Web, DB server to the payment server, the method comprising the steps of:

a) positioning the Web, DB server in one of a first nation state and a second nation state:

b) positioning the payment server in the first nation state;

c) using the at least one first remote computer to identify an item to be purchased from at least one item registered for purchase on the Web, DB server;

d) communicating a purchase request for the item identified to be purchased by a buyer from the at least one first remote computer to the Web, DB server;

e) switching of communication from the buyer with the Web, DB server to the payment server;

f) providing credit card payment information by the buyer for the item to be purchased from the at least one first remote computer to the payment server;

g) transferring credit card payment confirmation information from the payment server to the Web, DB server; and h) up-dating the Web, DB server with respect to the purchase of the item identified by the buyer.]

[2. The method of claim 1, wherein the second nation state has no available credit card information transaction security sufficient to meet the security requirements of the buyer.]

[3. The method of claim 2, wherein the first nation states is the United States of America.]

[4. The method of claim 2, wherein the second nation states is the People's Republic of China.]

[5. The method of claim 1, further comprising the steps of:

i) transferring the credit card payment information for the item to be purchased from the payment server to a buyer's bank via an acquiring bank;

j) processing of the credit card payment information by the buyer's bank for a validation decision result; and k) communicating the result to the payment server via the acquiring bank.]

[6. The method of claim 5, further comprising the step of:

l) communicating confirming purchase information by the payment server to the buyer.]

[7. The method of claim 6, further comprising the step of;

m) communicating confirming purchase information to the Web, DB server.]

[8. The method of claim 7, further comprising the step of:

n) up-dating of the Web, DB server of the at least one item registered for purchase using the at least one second remote computer.]

[9. The method of claim 5, further comprising the step of:

i) exchanging buyer purchase information between the Web, DB server and the at least one second remote computer with respect to the purchase of the item identified by the buyer to include buyer's identity information and quantity purchased in order for merchant to provide and service the at least one item registered for purchase.]

[10. The method of claim 1, further comprising the step of:

i) up-dating of the Web, DB server of the at least one item registered for purchase using the at least one second remote computer.]

[11. The method of claim 1, further comprising the step of:

i) exchanging buyer purchase information between the Web, DB server and the at least one first remote computer with respect to the purchase of the item identified by the buyer to include buyer's identity information and quantity purchased in order for merchant to provide and service the at least one item registered for purchase.]

[12. A system for conducting on-line buying by a buyer in an e-Commerce transnational business environment comprising:

a payment server having a credit card information transaction security system, a Web, DB server having a credit card information transaction security system less secure than the credit card information transaction security system of the payment server, at least one first remote computer, at least one second remote computer, at least one first communication channel connecting the at least one first remote computer to the payment server and to the Web, DB server, at least one second communication channel connecting the at least one second remote computer to the Web, DB server, and at least one third communication channel connecting the Web, DB server to the payment server, wherein the Web, DB server is positioned in one of a first nation state and a second nation state and the payment server is positioned in the first nation state.]

[13. The system of claim 12, wherein the first nation state is the United States of America.]

[14. The system of claim 12, wherein the Web, DB server is positioned in the second nation state.]

[15. The system of claim 12, wherein the Web, DB server is positioned in the first nation state.]

[16. The system of claim 12, further comprising a buyer's bank and an acquiring bank.]

*17. An online method for a payment server to support online buying over the Internet, the online method comprising:*

*receiving, at the payment server, credit card payment information transmitted from a buyer for payment of one or more items identified for purchase from a website listing the items, wherein the credit card payment information is received after online communication of the buyer has been switched from the website listing the items to a website supported by the payment server, wherein the switching of the online communication of the buyer is after an indication from the buyer to buy the one or more of the items;*

*sending the credit card payment information to an established financial channel;*

*receiving a credit card payment processing decision from the established financial channel; and*

*sending credit card payment confirmation information; wherein:*

*transmission of information about the items for purchase between a server supporting the website listing the items and the buyer, before occurrence of the indication to buy, is less secure than transmission, from the buyer, of the credit card payment information, the transmission of the credit card payment information being performed under a security protocol for encryption of the credit card payment information, said security protocol providing at least 128 bit encryption for the credit card payment information;*

*the payment server has a respective IP address different from a respective IP address of the server supporting the website listing the items;*

*the sending of the credit card payment confirmation information updates the server supporting the website listing the items, with respect to the purchase of the one or more items identified by the buyer, in support of a real-time purchasing/sales environment on the website listing the items;*

*the server supporting the website listing the items is in one of a first nation state or a second nation state; and*

*the payment server is in the first nation state.*

*18. The method of claim 17, wherein the security protocol is a Secure Sockets Layer (SSL) protocol.*

*19. A computer program product comprising a non-transitory computer readable medium and instructions on the medium executable by a processor of a computer system to support online buying over the internet by carrying out operations comprising:*

*receiving, at a payment server, credit card payment information transmitted from a buyer for payment of one or more items identified for purchase from a website listing the items, wherein the credit card payment information is received after online communication of the buyer has been switched from the website listing the items to a website of the payment server, wherein the switching of the online communication of the buyer is after an indication from the buyer to buy the one or more of the items;*

*sending the credit card payment information to an established financial channel;*

*receiving a credit card payment processing decision from the established financial channel; and*

*sending credit card payment confirmation information; wherein:*

*transmission of information about the items for purchase between a server supporting the website listing the items and the buyer, before occurrence of the indication to buy, is less secure than transmission, from the buyer, of the credit card payment information, the transmission of the credit card payment information being performed under a security protocol for encryption of the credit card payment information, said security protocol providing at least 128 bit encryption for the credit card payment information;*

*the payment server has a respective IP address different from a respective IP address of the website listing the items;*

*the sending of the credit card payment confirmation information updates the server supporting the website listing the items, with respect to the purchase of the one or more items identified by the buyer, in support of a real-time purchasing/sales environment on the website listing the items;*

*the server supporting the website listing the items is in at least one of a first nation state or a second nation state; and*

*the payment server is in the first nation state.*

*20. The computer program product of claim 19, wherein the security protocol is a Secure Sockets Layer (SSL) protocol.*

* * * * *